United States Patent
Vijayvergia et al.

(10) Patent No.: US 11,989,670 B1
(45) Date of Patent: May 21, 2024

(54) SYSTEM AND METHODS FOR PREEMPTIVE CACHING

(71) Applicant: UIPCO, LLC, San Antonio, TX (US)

(72) Inventors: Gunjan C. Vijayvergia, San Antonio, TX (US); Anand Shah, Helotes, TX (US); Alan David Chase, Boerne, TX (US); Anil Sanghubattla, San Antonio, TX (US); Andrew P. Jamison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 205 days.

(21) Appl. No.: 17/520,796

(22) Filed: Nov. 8, 2021

Related U.S. Application Data

(60) Provisional application No. 63/111,426, filed on Nov. 9, 2020.

(51) Int. Cl.
| | |
|---|---|
| *G06Q 10/00* | (2023.01) |
| *G06F 12/0802* | (2016.01) |
| *G06Q 10/0631* | (2023.01) |
| *G06Q 30/0201* | (2023.01) |

(52) U.S. Cl.
CPC ..... *G06Q 10/0631* (2013.01); *G06F 12/0802* (2013.01); *G06F 2212/60* (2013.01); *G06Q 30/0201* (2013.01)

(58) Field of Classification Search
CPC ............ G06Q 10/063; G06Q 10/0631; G06Q 10/06311
See application file for complete search history.

(56) References Cited

U.S. PATENT DOCUMENTS

| | | | |
|---|---|---|---|
| 7,895,448 B1* | 2/2011 | Satish | G06F 21/577 |
| | | | 713/188 |
| 9,414,222 B1 | 8/2016 | Dixon | |
| 10,218,811 B1* | 2/2019 | Demsey | H04L 67/535 |
| 2011/0040718 A1* | 2/2011 | Tendjoukian | H04L 67/5681 |
| | | | 706/54 |
| 2013/0275685 A1* | 10/2013 | Barbas | G06F 16/24552 |
| | | | 711/E12.017 |

(Continued)

OTHER PUBLICATIONS

Ebrahimi, E., Chang, J. L., Mutlu, O., & Patt, Y. N. (2011). Prefetch-aware shared-resource management for multi-core systems. ( Year: 2011).*

(Continued)

*Primary Examiner* — William S Brockington, III
(74) *Attorney, Agent, or Firm* — Plumsea Law Group, LLC

(57) ABSTRACT

A system and method that allow an institution's customer's anticipated data to be stored in a cache in advance of a request for that data, using predictive models based upon analyses of each specific customer's historical patterns. For example, when a customer logs on to an institution's server, a machine learning application on that server may predict the type or category of data that the customer may intend to retrieve, based upon his or her previous patterns when logging on. Typical categories of data may include, for example, account balances, status of outstanding loans, credit card data, and insurance information. By populating the cache with such anticipated data, that data may be more quickly accessed by the customer.

20 Claims, 8 Drawing Sheets

(56) References Cited

U.S. PATENT DOCUMENTS

| | | |
|---|---|---|
| 2014/0095943 A1 | 4/2014 | Kohlenberg |
| 2014/0101170 A1* | 4/2014 | Parekh .................... G06F 16/68 |
| | | 707/749 |
| 2014/0258094 A1 | 9/2014 | Jouhikainen |
| 2015/0227463 A1 | 8/2015 | Byers |
| 2016/0191650 A1* | 6/2016 | Rong .................... H04L 67/568 |
| | | 709/213 |
| 2019/0370176 A1* | 12/2019 | Priyadarshi ......... G06F 12/0893 |
| 2021/0329091 A1* | 10/2021 | Yellin ................. H04L 67/5681 |

OTHER PUBLICATIONS

Non-Final Office Action datedAug. 2, 2022 for U.S. Appl. No. 17/520,839.

Non-Final Office Action dated Jun. 20, 2023 for U.S. Appl. No. 17/520,839.

\* cited by examiner

SYSTEM AND METHODS FOR PREEMPTIVE CACHING

CROSS-REFERENCE TO RELATED APPLICATIONS

This application claims the benefit of Provisional Patent Application No. 63/111,426, filed Nov. 9, 2020, and titled "Systems and Methods for Preemptive Caching," which is incorporated by reference herein in its entirety.

TECHNICAL FIELD

This disclosure relates to improving the delivery time of data or other information transmitted over a network to a remote customer's computing device.

BACKGROUND

Persons communicating remotely over the Internet or some other network to a remote server housed at a remote institution such as a bank or other financial institution, a stock brokerage firm, a retailer, a university or other institution often demand very quick responses to their requests. Thus, it may be very important for the institution housing the remote server to deliver any requested data or other information stored on the remote server as quickly as possible. In many cases, the remote server may take a significant amount of time identifying the storage location of any such data or other information, retrieving such data or other information and transmitting that data or information to the person requesting the data or information. Even minor delays in the delivery of requested data or information may be considered to be unacceptable by certain of the institution's customers. Such delays may lead to frustrated or unhappy customers, who might then decide to transfer their business to the institution's competitors.

For these reasons, there is a need for optimizing the delivery of data or other information from an institution to a remote customer's computing device.

SUMMARY

In one aspect, embodiments include a system for the delivery of data to an institution's remote customers' computing devices that include a server in the institution housing a machine learning module. The machine learning module is configured to accumulate usage patterns of at least some of the institution's remote customers, and to develop rules based upon the usage patterns. The machine learning module is also configured to apply the rules in order to transmit information, that the machine learning module anticipates the customers might request, to a cache.

In another aspect, embodiments include a method for improving the delivery of data from a server at an institution to its customers' computing devices that includes analyzing the customers' usage patterns, and compiling a list of rules for each specific customer. Each specific customer has a cache assigned specifically to that specific customer. The rules are then applied to predict which specific data that each specific customer might request, and then transmitting that predicted data to the cache assigned to that specific customer.

In yet another aspect, embodiments include a system for reducing any delay in retrieving data stored at an institution that includes a server housed at the institution. The server is configured to respond to requests for data transmitted by customers from their computing devices. The server includes a machine learning module that analyzes the institution's customers' usage patterns and develops a set of rules for each specific customer. A cache is housed in the server, an external server or on the specific customer's computing device. The set of rules for each specific customer is based on the time the specific customer logs on to the server, the date on which the specific customer logs on to the server, or the specific customer accessing a particular website or a particular app on the specific customer's computing device.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
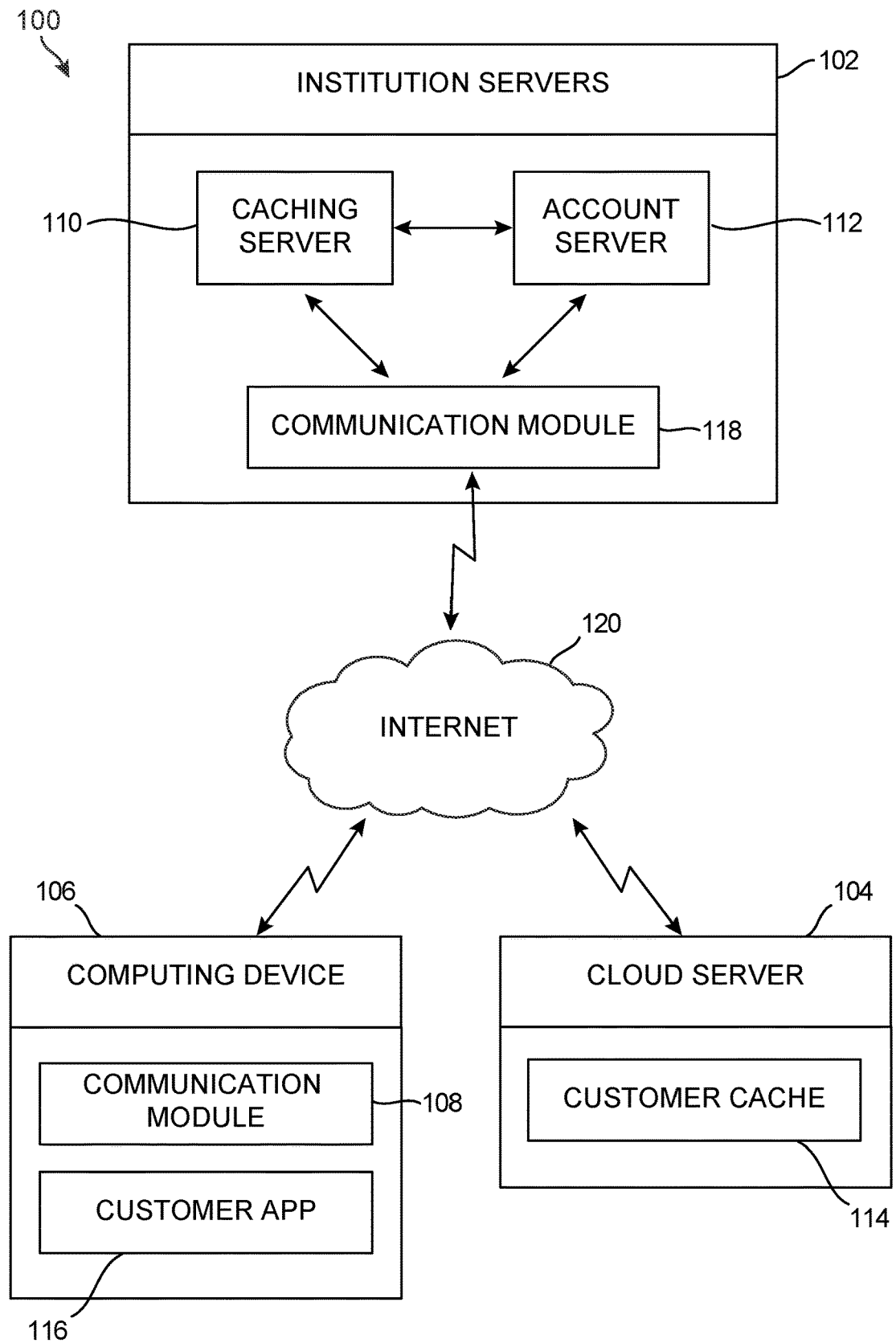
FIG. 1 is a schematic diagram of a network implementing optimized data caching, in an embodiment.

The embodiments disclosed herein provide systems and methods for improving customers' experiences when they remotely contact servers in their bank, insurance company or other institution, by more quickly delivering, for example, any requested data or information. In some embodiments, the server may use machine learning to establish the customers' historical patterns when they log on to the server from their remote location. Based upon those usage patterns, the server may then populate data caches with the data that the customer is likely to demand. Thus, when the customer logs on, the data is already in the cache, ready to be transmitted to the customer over the Internet or over some other network. In some embodiments, the cache may even be operating in the customer's own device. In all of these embodiments, the data or other information stored in the cache may be encrypted.

As used herein, the terms "data" and "information" shall have the same meaning, and may be used interchangeably. The term "institution" shall refer to a bank, an insurance company, a credit union, a savings and loan, a retailer or other organization or company that customers may access remotely. The term "computing device" shall refer to any of a smart phone, a mobile device, a laptop, a tablet, a desktop computer or other device that may be used for remote access to an institution's server. The terms "customer," "user" or "client" may be used interchangeably herein, and shall refer to any person who has an established relationship with an institution and needs access to data stored at the institution. The term "external server" refers to a server housed outside of the institution. The term "usage patterns" shall refer to any type of pattern established by a customer of an institution over a period of time.

The caching that has been used in conventional systems only applies after data is actually retrieved from the remote system. Briefly, the embodiments described herein allows a cache containing the requested data or information to be prepared in advance of a request for that data, using predictive models based upon analyses of each specific customer's historical patterns. For example, when a customer logs on to an institution's server, a machine learning application on that server may predict the type or category of data or information that the customer may intend to retrieve, based upon his or her previous patterns when logging on, for example at a particular time of day, or a particular day of the month or the week, or some other type of activity the application may have recorded and analyzed. Typical categories of data may include, for example, account balances, status of outstanding loans (possibly including interest rates on the loans), and credit card data.

Such a predictable schedule may enable the machine learning application to develop at least one set of rules for a particular customer. However, in many cases, after the machine learning module has developed a set of rules for a specific customer, the machine learning module may need to modify the rules later on whenever the usage patterns change or evolve. Also, the machine learning module may merge additional data that was just (or recently) received with data already stored in the cache. It may also remove any stale or out-of-date data that had remained in the cache.

The cache that is being populated may be installed on a customer's own computing device, it may be on a caching server housed at the institution, it may be on a cloud server, or at some other location between the customer's computing device and the institution's server. The computing device may be communicating with the institution's server over the Internet, over a cable network, over a telephone network, or over a WiFi connection, for example. In many embodiments, the data may be encrypted initially at the institution, and it may be encrypted again before it reaches the customer's computing device. In many cases, the data elements may be packaged into a JSON payload, and the payload would itself be encrypted, and then decrypted at the customer's computing device, so that it may be displayed on the computing device's screen.

For example, if the institution is a bank, the customer may have a variety of different accounts at the bank, such as investment accounts, savings accounts, insurance accounts, checking accounts, credit account, joint accounts, or accounts for specific purposes such as education or retirement accounts. If the institution is an insurance company, the customer may be looking for information related to a recent claim, may be looking for payment information, or may be considering purchasing additional types of coverage. If the institution is a credit card company, the customer may be checking his or her balance, or may be seeking to dispute a charge. In these examples, the customer may be planning on transferring funds from a savings account to an investment account (in the case of a bank), pay bills or lodge a claim (in the case of an insurance company) or make payments or request a higher credit limit (in the case of an insurance company).

FIG. 1 is a schematic diagram of a network implementing optimized data caching in an embodiment. The network in this embodiment may include an institution server 102 in communication, using the institution's communication module 118, over the Internet 120 with a cloud server 104, which in turn is in communication over the Internet 120 with a customer's computing device 106 via communication module 108 in computing device 106. The set of institution servers 102 include a caching server 110 (which is described below with reference to FIG. 2) and an account server 112. Caching server 110 is responsible for anticipating the information the customer may request, and directing the storage of that anticipated information to a cache 114 associated with the account of the customer using computing device 106. Account server 112 stores customer account information, including one or more accounts associated with the customer using computing device 106. In the embodiment shown in FIG. 1, such anticipated information is stored in a customer cache 114 located on cloud server 104. In other embodiments, the cache may be maintained on a server within the institution, or it may be maintained in the customer's computing device. In any of these embodiments, customer cache 114 is selected to optimize the transmission of this anticipated information to computing device 106. Customer app 116, running on customer's computing device 106, receives the anticipated information and, depending on customer action, displays it for the customer using computing device 106.

The data or information may be encrypted at the institution's caching server. It may also be encrypted at the cloud server or when it is stored in the computing device's cache.

Figure 2:
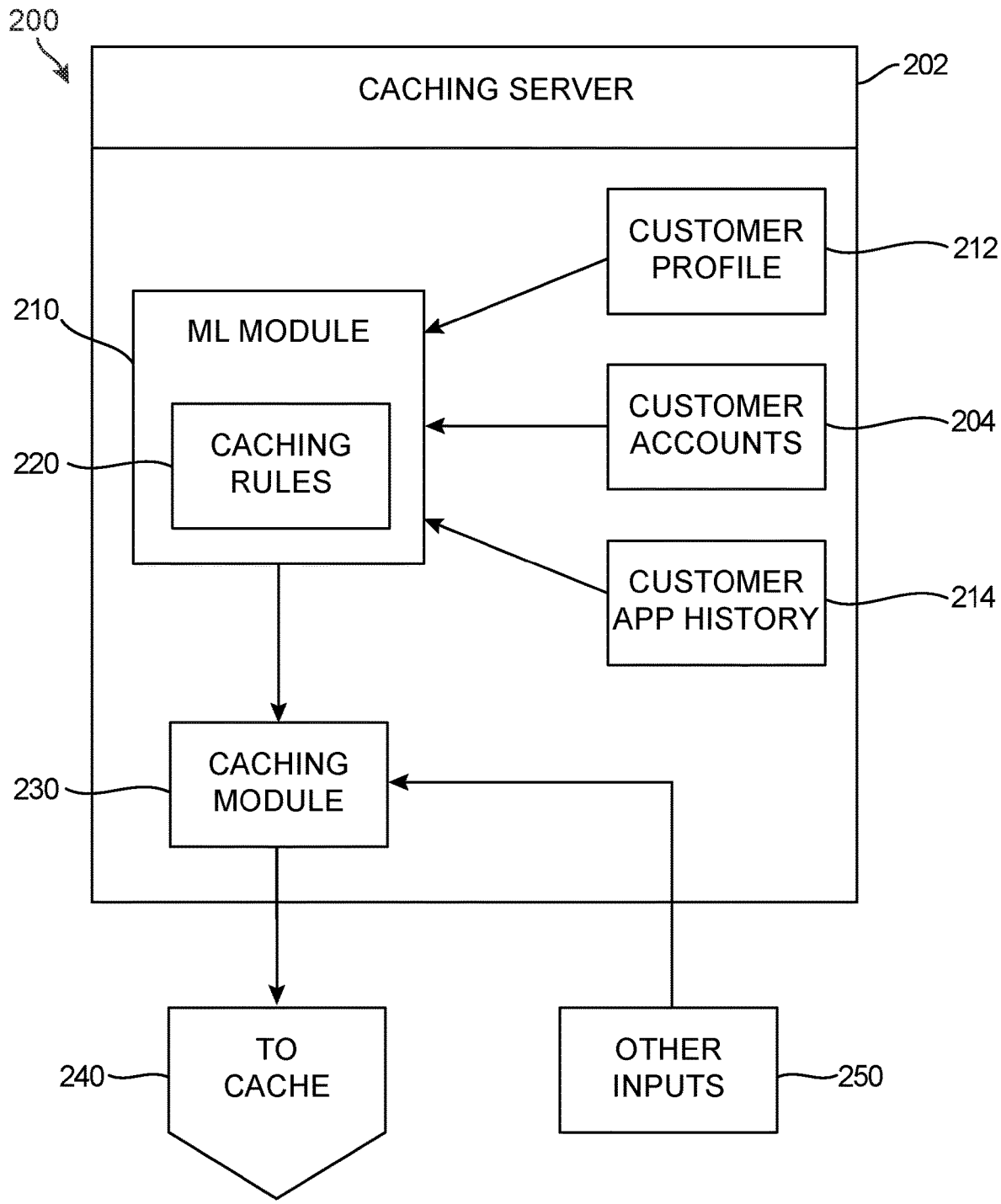
FIG. 2 is a schematic diagram of a caching server that implements optimized data caching, in an embodiment.

FIG. 2 is a schematic diagram 200 of a caching server 202 that implements optimized data caching in an embodiment. Customer accounts database 204 is a database holding information related to a set of customer accounts. A machine learning module 210 located on caching server 202 receives information from customer accounts database 204, customer profile database 212, and customer app history database 214 to develop rules that enable it to predict which information that a specific customer is intending to access. It can then develop a set of caching rules 220 relating to the likelihood of future requests made for the account associated with customer accounts database 204. Any such rules are stored within machine learning module 210. These rules may be modified as the customer's usage patterns evolve over time. When machine learning module 210 anticipates a future request for an account, it directs a caching module 230 to transmit that information over the Internet or some other network via channel 240, for example.

In this embodiment, other inputs 250 from external sources can also forward populating instructions to caching module 230. For example, an input 250 from an external source might direct caching module 230 to cache information associated with an anticipated future request, based on a known event such as the start of a new fiscal year or a or scheduled event such as a scheduled attendance at a sales show, for example. Although FIG. 2 shows the "other inputs" data from block 250 being provided to caching module 230, in other embodiments that data may be provided to ML Module 210, to caching rules 220 or to two or three of caching module 230, caching rules 220 and machine learning module 210. In some embodiments, such other inputs 250 are associated with devices associated with the customer. For example, a sailor may be returning home after a voyage of several weeks. An example of an "other input" could be the sailor having notified his or her bank as to the scheduled date of his or her return ahead of time, or it could also be the sailor sending a message via an external source such as his or her computing device to the caching module. Similar scenarios could include a salesperson returning from an extended trip, a family returning from a vacation, or a student returning to college.

In another example, an operating system running on a customer's computing device may be able to predict that the customer is going to access a customer account at an institution. In this example, the caching module could be notified by the computing device so that it could store information in a cache that the customer could access when he or she logs on to the institution's server.

Machine learning module 210 develops its rules for each specific customer by accumulating data regarding that particular customer's patterns, and then applies those rules as the customer logs on to the institution's server. For example, a particular bank customer may have a generally established habit of logging on every day soon after 9:00 am to check the balances in his or her various account, to make sure that all checks debited to the checking account were indeed his or her own checks with his or her own signature, and so on. In that case, the institution server would populate the customer's cache with all information relating to his or her account, possibly including images of any checks that were paid from the account. As another example, a customer may like to check that he or she has paid his or her credit card bills or utility bills, for example, and, for each bill, does so on roughly the same day of the month. In this example, the machine learning module could anticipate which bill should have been paid by that day, and could populate the cache with an image of the check for that specific payment.

Machine learning module 210 may also develop risk profiles for certain of its customers. For example, a bank, credit union or other financial institution may have customers such as businesspersons or farmers who often apply for loans from the institution, or may overdraw their accounts. These institutions may find it beneficial to develop risk profiles for such customers, so that they can respond appropriately to offline banking requests.

Data may be classified, to some extent, as less volatile data or more volatile data. The names of and numbers of accounts a customer may have are examples of less volatile data for customers of a bank, while the actual amount of funds in a checking account would be an example of volatile data. The machine learning application could merge the less volatile data with the volatile data and then store the merged data in a cache in the cloud, and eventually display that data on a computing device's screen. The machine learning application could also remove stale data (such as out-of-date account balances) from the cloud.

Figure 3:
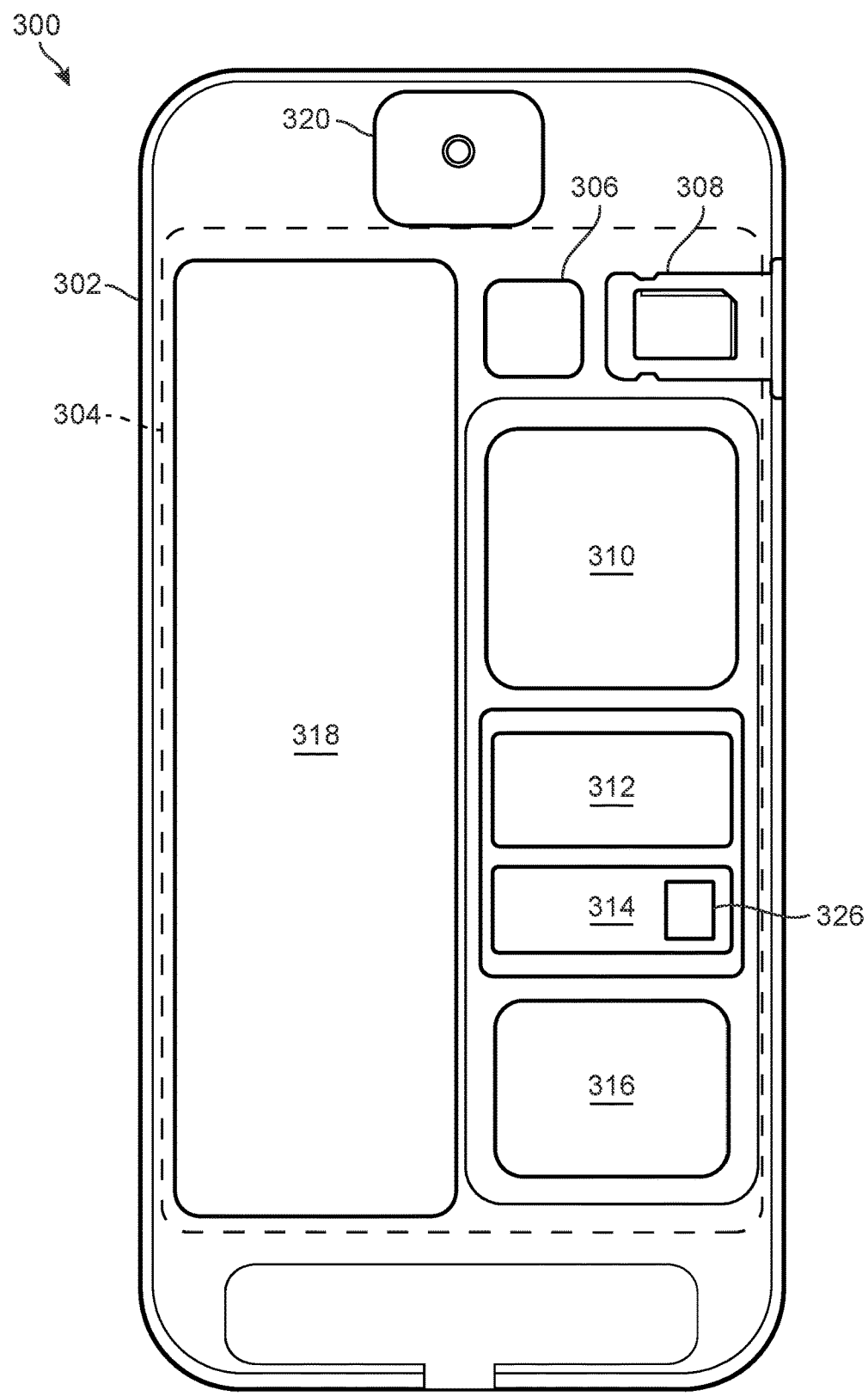
FIG. 3 is a schematic diagram of a customer's computing device containing an application implementing optimized data caching, in an embodiment.

Computing device 106 shown schematically in FIG. 1, may be a mobile device such as a smart phone. FIG. 3 is a schematic diagram 300 of common components of a smart phone 302 that may be used to implement the embodiments disclosed herein. Functionally similar components are present in the other types of computing devices listed above. In this example, smart phone 302 includes a display 304, which displays applications and data stored on smart phone 302. Smart phone 302 additionally includes a GPS component 306. Smart phone 302 includes a subscriber identity module (SIM) 308 with which smart phone 306 registers on cellular/data networks. In some embodiments, SIM 308 also serves as an identifying means with which to associate smart phone 302 with a particular customer who has an account on a remote server.

Smart phone 302 includes a processing unit 310 which acts as a control module for the components of mobile device 302, including display 304 and camera 320. Smart phone 302 includes a connection module 312. Connection module 312 is associated with wired connections to smart phone 302, for example, for charging smart phone 302 or for making a wired connection between smart phone 302 and another device.

Smart phone 302 includes a memory 314. Memory 314 stores a variety of data and applications, including pre-loaded applications and data that would be common to all customers of such a device and applications and data that have been stored in the course of regular use of smart phone 302 by a particular customer and are thus characteristic of the particular customer using smart phone 302. In this embodiment, memory 314 also includes a cache 326. Smart phone 302 includes communications module 316 which controls communications with the institution server and/or with a cloud server. Communications module 316 executes wireless communications (such as Wi-Fi, Bluetooth, near field communication (NFC) technologies, and communications over the Internet) between smart phone 302 and other devices, servers, and databases. Communications module 316 thus functions as a link to remote servers. Smart phone 302 includes a battery 318 which provides power to the various components of smart phone 302.

In some cases, the population of a cache may be triggered when a customer uses a particular app on his or her computing device or accesses a particular website. For example, the customer might use an app to access websites that list the prices of used cars, or has a pattern of using a social media app to plan his or her visits with friends at distant locations In either case, the machine learning module might anticipate that the customer may want to either check his or her balances in his or her accounts at a bank, or may want to check the status of his or her credit card accounts. In the case of a customer visiting real estate sites, the machine learning module may anticipate the customer's requesting an update on his or her credit score.

Figure 4:
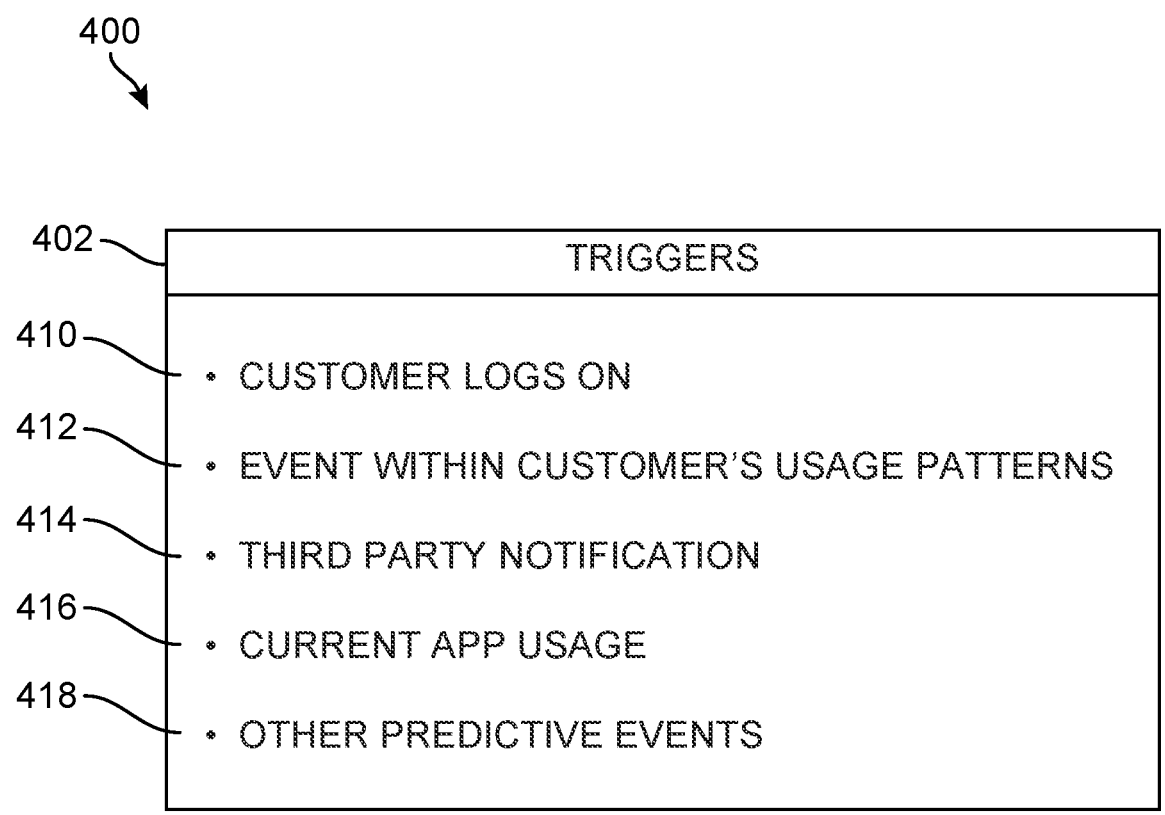
FIG. 4 is a chart of different events that may trigger caching for a customer account, in an embodiment.

FIG. 4 is a chart 400 showing different events 402 that might trigger caching for a customer account, in an embodiment. Chart 400 is not exhaustive but is only intended to illustrate specific events that could trigger caching actions for a customer account. Event 410 happens when a customer logs onto an account. Such a "login" event could happen via different channels which access the account, whether through a web portal, a mobile app, or via authenticating their identity with a service representative. In this embodiment, caching consists of preparing data the customer is highly likely to attempt to access for rapid transmission to the customer. Event 410 is an example of "default triggers" for caching processes, which are pre-set by the institution and do not depend on individual customers' usage patterns. Event 412 is an event that fits into an individual customer's pattern of usage. For example, if a customer generally checks a specific account after login, caching the balance on the account upon login would expedite the delivery of this information to the customer. Other examples were provided above. Event 414 happens upon "third party" notification of an anticipated action by the customer. For example, a device associated with the customer could send the caching server a notice that the customer is about to use an app associated with his or her account. Event 416 occurs when the customer is currently using an app associated with his or her account.

Based on usage patterns particular to the customer or in general for all customers of a certain classification (age, income level, etc.), the app may predict what information the customer is likely to request next when using this app, and places this information in the cache. Event 418 includes other predictive events that occur which indicate with some likelihood that the customer is about to require some particular piece of information. For example, if the customer is interacting with a service representative over the phone, the service representative may cache information he or she may think the customer is likely to need in the near future.

Figure 5:
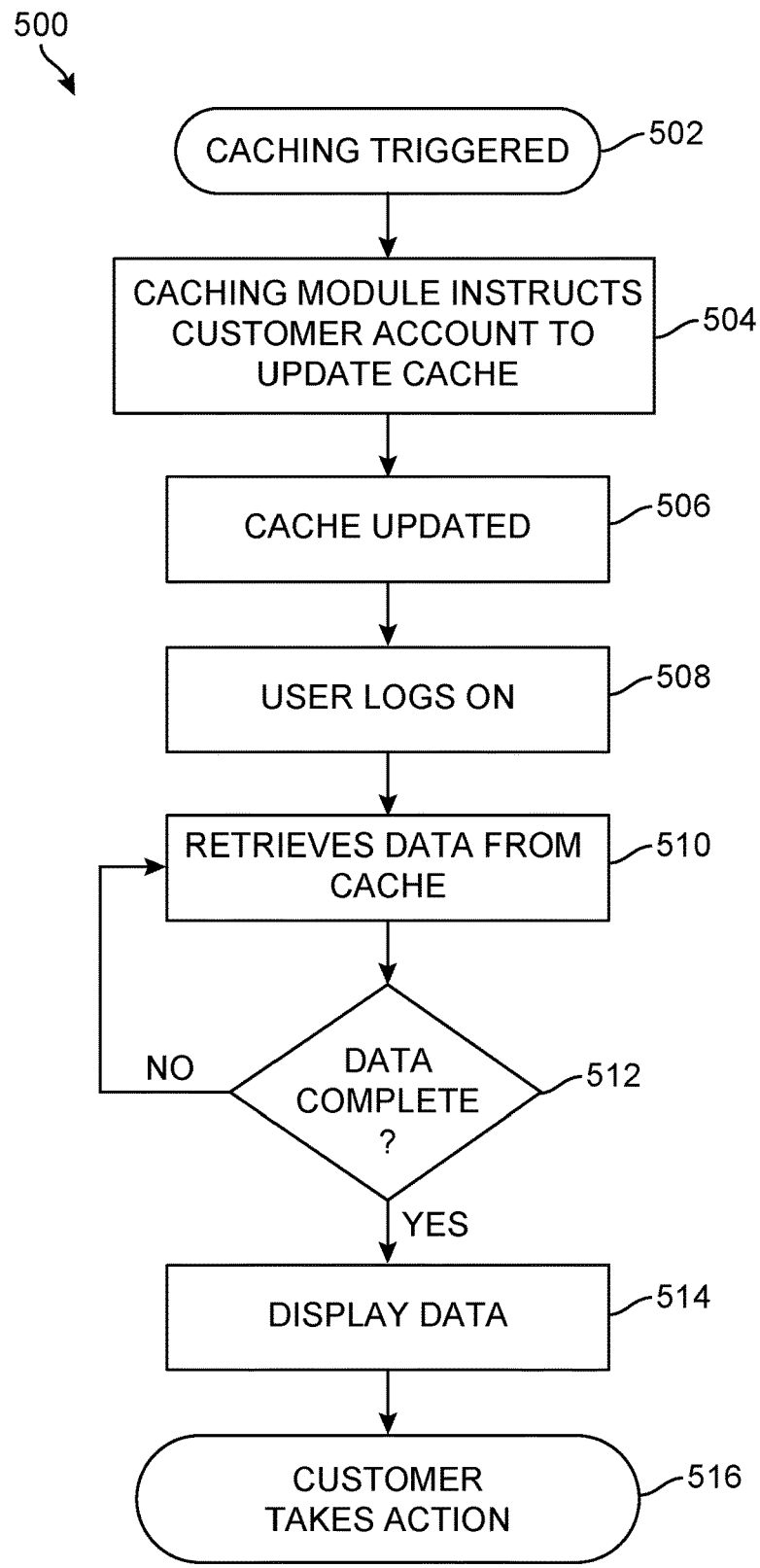
FIG. 5 is a flowchart illustrating a method for optimized data caching before the customer has logged into their account, in an embodiment.

FIG. 5 is a flowchart 500 illustrating a method for optimized data caching before the customer has logged into his or her account, in an embodiment. Flowchart 500 begins as some event occurs which causes information to be placed in a cache associated with a particular customer account in step 502. For example, this may be the customer's payday, and he or she may likely check that he or she has been paid. As another example, a particularly large deposit has been made in the account, and the algorithm in the machine learning module anticipates that the customer will be checking the account soon. As yet another example, a large check has been presented for payment from the account, and the bank itself may have prompted the customer to check the account. In any case, this causes a caching module to request updated information for that account from a customer account database in step 504.

The caching module then updates the cache with that information in step 506. In some embodiments, the location of the cache is selected so as to optimize the transmission of the information to the customer upon their login to the account, and an app associated with the account is notified of the location. At some later time, the customer logs in to his or her account in step 508. Upon login, the app retrieves the data from the cache in step 510. In step 512, the app checks to determine whether the data is complete. If, at step 512, the app determines that additional data needs to be cached, it returns to step 510 to retrieve this additional data. When the app determines at step 512 that the data is complete, it displays the complete data set in step 514. At step 516, the customer then takes an action based on the displayed information. For example, the customer may decide make a major purchase, take out a loan, re-mortgage his or her house or pay off his or her credit card debt. In some cases, the customer may decide not to take any action. This decision—not to proceed further—may itself be considered to be an action.

Figure 6:
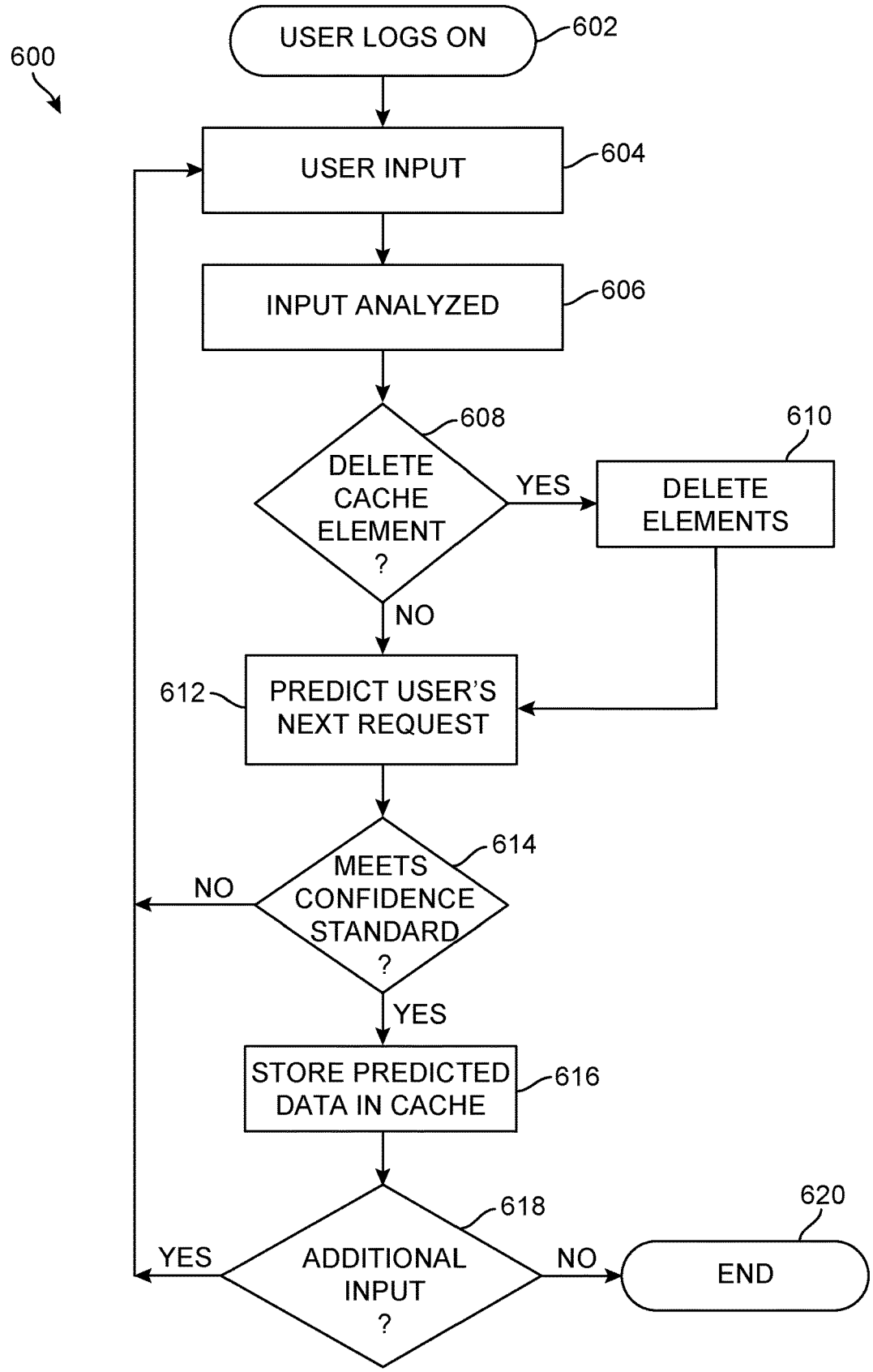
FIG. 6 is a flowchart illustrating a method for populating a cache, in an embodiment.

FIG. 6 is a flowchart 600 illustrating a method for a remote server to populate a cache, in an embodiment. In this example, the process is triggered when the customer logs on to the institution's server. Flowchart 600 illustrates the steps a server may undertake in response to customer interaction with an account associated with the server to populate a cache. In this way, the server builds a "journey map" of predicted actions the customer could take, thus expediting the delivery of wanted information to the customer. The method of flowchart 600 begins, for example, as the customer of an account associated with a remote server logs on to their account in step 602. In other cases, step 602 could be an authentication event, such as when the user enters authentication data (such as mother's maiden name) and/or the system verifies the authentication. In step 604, the customer inputs a request of the remote server. In step 606, the server analyzes the inputted request to determine the likely next request the customer will make. In some embodiments, the component of the server that undertakes this analysis is a machine learning module. In step 608, the server determines whether the customer's input invalidates any information it has previously cached. If so, at step 610, it deletes any invalid information.

Then, at step 612, the server predicts the next item of data the customer is most likely to request and estimates how likely the customer is to request it. In some embodiments, such a prediction is made from a pre-established pattern of usage for that customer. At step 614, this likelihood is compared to a confidence standard. In some embodiments, such a confidence standard is determined based on the computing resources needed to fulfill the customer's request and place the needed information in the cache. If the customer's request does not meet the confidence standard, then the method of flowchart 600 returns to step 604 so that the user may provide additional input. If it does meet the confidence standard, then at step 616, this embodiment stores the anticipated data in the cache based on the predicted request. In some embodiments, the location of this cache is selected so as to optimize the delivery of this request to a device associated with the customer should the customer actually request this information. At step 618, if the customer has additional information to input to the server, the method returns to step 604. Otherwise, the method ends at step 620.

Figure 7:
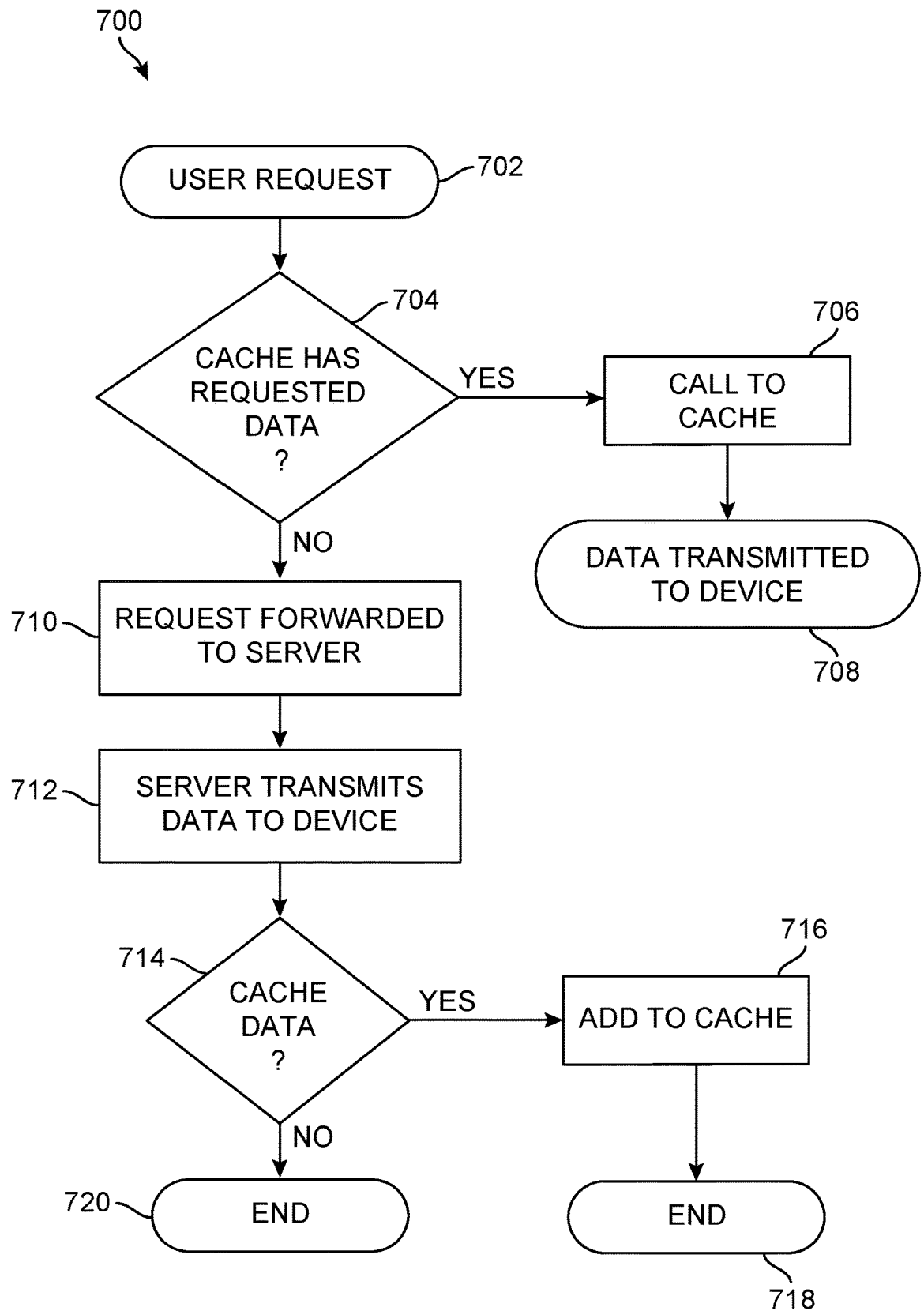
FIG. 7 is a flowchart illustrating a method for optimizing data caching, in an embodiment.

FIG. 7 is a flowchart 700 illustrating a method for optimized data caching showing the communications between a customer's computing device, a cache, and a server, in an embodiment. Flowchart 700 represents how the "journey map" of FIG. 6 may be implemented from the perspective of the customer's computing device. Note that flowchart 700 represents only a portion of the communications between the customer's device, cache, and server. In step 702, a customer's computing device makes a request of a remote server. Such a request could include requesting account information for an account associated with the customer using the device hosted on the remote server. At step 704, the customer's computing device checks to see if there is data relevant to the request in a cache associated with the computing device. Note that in the circumstance contemplated by the method of this embodiment, in the event the server has cached data relevant to this customer, the server would have notified an app associated with the customer's device of the contents and location of the cache. If indeed there is such data, then at step 706, the customer's device makes a call to this cache and at step 708, the data is transmitted from the cache to the device. In some embodiments (not shown) the method may return to step 702 to await further communications from the customer. If the requested data is not available in a cache, then the request is forwarded to the remote server in step 710.

Then, at step 712, the server transmits the requested data to the device. At step 714, the server analyzes the request to determine if there is data that should be cached in advance of further anticipated requests from the customer. In some embodiments, such analysis is carried out by a machine learning module to determine the most likely next request the customer will make. If the server determines, to some degree of confidence, that there is additional data that can be cached to optimize the response to the customer's likely next request, then the server caches such data at step 716, and the method then ends at step 718. If the server determines that there is no data that can be cached to that degree of confidence, then the method ends at step 720.

It should be noted that flowchart 700 represents only a portion of the communications between the customer's device, cache, and server so that even though the method, in the example shown in FIG. 7, ends at step 720, the communications between the server and customer's device may continue past that point.

Figure 8:
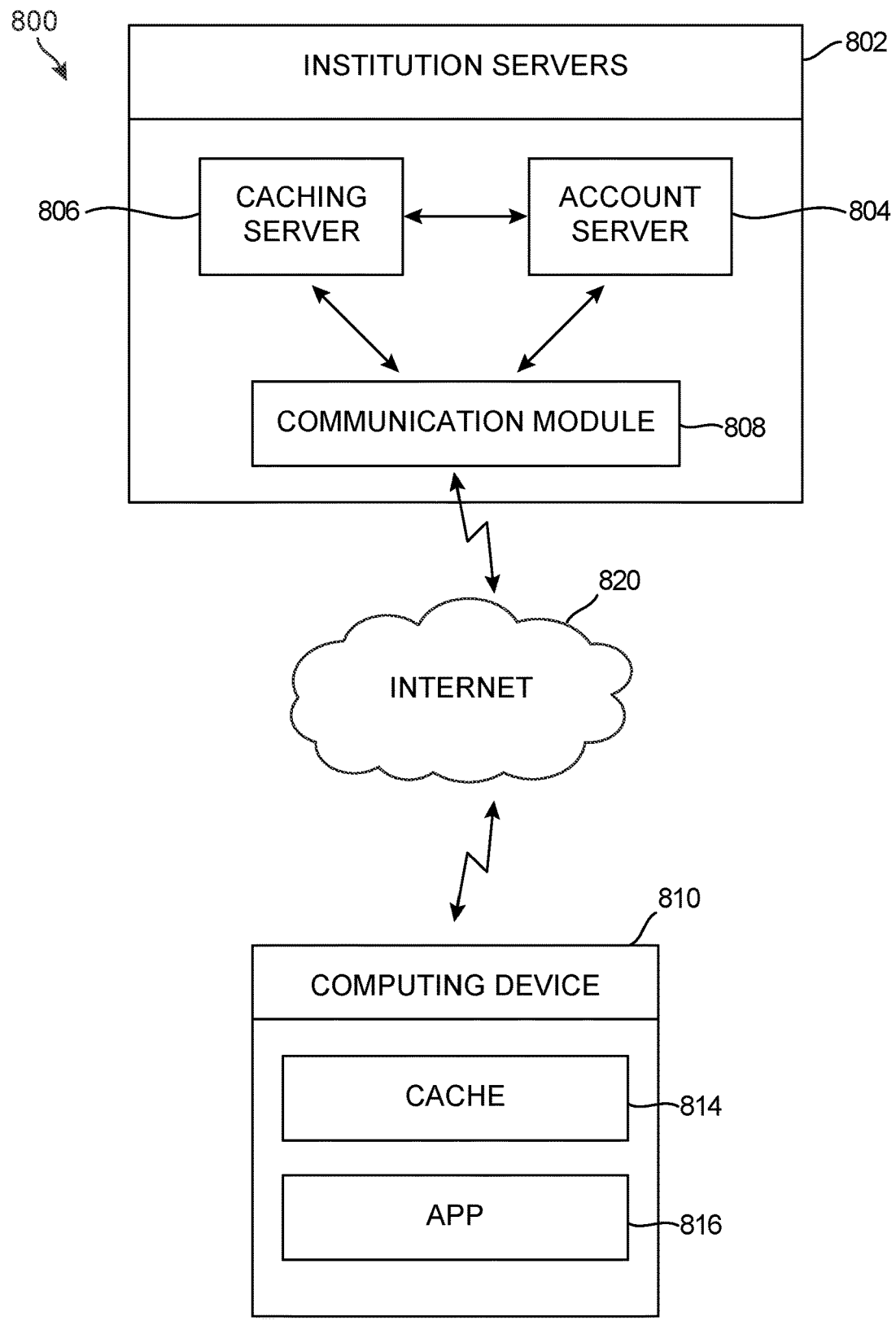
FIG. 8 is a schematic diagram of an embodiment in which a cache is implemented in a customer's computing device.

FIG. 8 is a schematic diagram 800 of an embodiment in which a cache 814 is implemented in a computing device 810. Although diagram 800 includes a computing device 810, in other embodiments computing device 810 could be replaced by any computing device capable of remote communication having the caching and customer interface functions outlined herein. In this embodiment, institution 802 includes a caching server 806 and an account server 804 in communication with a computing device 810 over the Internet via communications module 808. Account server 804 stores customer account information, including an account associated with the customer using computing device 810. Caching server 806 is responsible for anticipating and directing the storage in a cache of anticipated information associated with the account of the customer using computing device 810. In this embodiment, such anticipated information is stored in a customer account cache 814 located on computing device 810. An app 816 operating on computing device 810 accesses cache 814 when the customer using computing device 810 makes a request for which the anticipated information stored in the cache is needed. It then displays that information on the computing device's display, such as, in the example of FIG. 3, smart phone display 304.

The categories of data that may be cached includes financial data such as account balances, loan amounts and credit card data, as well as insurance information, such as the cost and scope of coverage. They also include other types of data such as credit scores, the prices and specification of a vehicles for sale, itineraries offered by cruise lines, descriptions of amenities at a resort or at a condo building, and airline or railroad schedules, for example. In the retail environment, the data that may be cached, in addition to price could include images and specifications of items offered for retail sale.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for improving the delivery of data to an a first computing device associated with a first customer of a financial institution comprising:
at least one server in the financial institution housing a machine learning module;
the machine learning module receiving customer profile data from a customer profile database, customer financial accounts data from a customer financial accounts database, and customer app history data from a customer app history database;
each of the customer profile data, the customer financial accounts data, and the customer app history data including data associated with the first customer and also including data associated with a plurality of remote customers associated with the financial institution;
wherein the machine learning module is configured to determine usage patterns among the customer profile data, the customer accounts data, and the customer app history data, and to develop rules based upon the usage patterns;
wherein the machine learning module is configured to apply the rules in order to transmit predicted data, that the machine learning module anticipates the first customer might request, to a cache when a likelihood of the predicted data being used by the first customer exceeds a confidence standard; and
the confidence standard is determined based on a first amount of computing resources needed to fulfill a request made by the first customer and based on a second amount of computing resources needed to place the predicted data into the cache.

2. The system of claim 1, wherein the cache is installed in one of the at least one server housing the machine learning module, another server housed at the institution, an external server, and a computing device associated with the first customer.

3. The system of claim 1, wherein the system is configured such that the first computing device associated with the first customer retrieves the predicted data from the cache.

4. The system of claim 1, wherein the usage patterns include the plurality of remote customers each checking an account balance on a predictable schedule.

5. The system of claim 1, wherein the predicted data is encrypted before it is transmitted to the cache.

6. The system of claim 5, wherein the predicted data is packaged into a JSON payload, and the JSON payload is encrypted at a same time.

7. The system of claim 1, further comprising storing risk profiles for the plurality of remote customers associated with the financial institution.

8. A method for improving delivery of data from a server at a financial institution to a cache associated with a customer of the financial institution comprising:
analyzing usage patterns associated with the customer and a plurality of remote customers associated with the financial institution with a machine learning module;
the machine learning module receiving customer profile data from a customer profile database, customer financial accounts data from a customer financial accounts database, and customer app history data from a customer app history database;
each of the customer profile data, the customer financial accounts data, and the customer app history data including data associated with the customer and also including data associated with the plurality of remote customers;
wherein the machine learning module is configured to analyze the usage patterns from among the customer profile data, the customer accounts data, and the customer app history data, and to develop rules based upon the usage patterns;
compiling a list of rules for each customer with the machine learning module based on the usage patterns, wherein each customer has a respective cache;
applying the list of rules to predict specific data that each customer might request;
transmitting the specific data to the cache when a likelihood of the specific data being used by the customer exceeds a confidence standard; and
the confidence standard is determined based on a first amount of computing resources needed to fulfill a request made by the customer and based on a second amount of computing resources need to place the specific data into the cache.

9. The method of claim 8, further comprising the customer retrieving the specific data from the cache.

10. The method of claim 8, wherein the step of transmitting the specific data to the cache is triggered by the customer logging on to the server.

11. The method of claim 8, wherein the server comprises a communication module that transmits the specific data over an internet network.

12. The method of claim 11, wherein the machine learning module modifies the list of rules for the customer as the usage patterns associated with the customer evolve.

13. The method of claim 8, wherein whenever the cache does not include all of the specific data that the customer has requested, a request is forwarded to the server which then transmits any unincluded requested data to a computing device associated with the customer.

14. The method of claim 8, further comprising the server building a journey map of predicted actions the customer could take.

15. A system for reducing any delay in retrieving data stored at a financial institution comprising:
- a server housed at the financial institution, wherein the server is configured to respond to requests for data transmitted by a customer of a plurality of customers of the financial institution from a computing device associated with the customer;
- the server comprising a machine learning module that analyzes usage patterns associated with each customer of the financial institution and develops a set of rules for each customer;
- a cache housed at one of the server, an external server and the computing device associated with the customer;
- wherein the set of rules for each customer is based upon at least one of a time a respective customer logs on to the server, a date on which the respective customer logs on to the server, and the respective customer accessing one of a particular website and a particular app on a respective customer computing device;
- wherein the machine learning module is configured to apply the set of rules in order to transmit predicted data, that the machine learning module anticipates the customer might request, to a cache when a likelihood of the predicted data being used by the customer exceeds a confidence standard; and
- the confidence standard is determined based on a first amount of computing resources needed to fulfill a request made by the customer and based on a second amount of computing resources need to place the predicted data into the cache.

16. The system of claim 15, further comprising a communications module housed in the financial institution that is in communication with the server and the cache.

17. The system of claim 15, further comprising a caching module configured to control transmission of the predicted data to the cache.

18. The system of claim 15, wherein the machine learning module is configured to receive customer profile data from a customer profile database, and to use the customer profile data in formulating caching rules.

19. The system of claim 17, wherein the caching module is configured to trigger caching upon receipt of a prompt from an external input.

20. The system of claim 19, wherein the external input comprises a third-party notification.

* * * * *